US008977625B2

(12) United States Patent
Buehrer et al.

(10) Patent No.: US 8,977,625 B2
(45) Date of Patent: Mar. 10, 2015

(54) INFERENCE INDEXING

(75) Inventors: Gregory T. Buehrer, Issaquah, WA (US); Li Jiang, Bellevue, WA (US); Paul Alfred Viola, Seattle, WA (US); Andrew Paul McGovern, Seattle, WA (US); Jakub Jan Szymanski, Redmond, WA (US); Sanaz Ahari, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 62 days.

(21) Appl. No.: 12/968,481

(22) Filed: Dec. 15, 2010

(65) Prior Publication Data
US 2012/0158738 A1    Jun. 21, 2012

(51) Int. Cl.
G06F 7/00     (2006.01)
G06F 17/30    (2006.01)

(52) U.S. Cl.
CPC ................................. *G06F 17/30867* (2013.01)
USPC ......................................... 707/741; 707/748

(58) Field of Classification Search
None
See application file for complete search history.

(56) References Cited

U.S. PATENT DOCUMENTS

2002/0150300 A1*  10/2002  Lee et al. ...................... 382/229
2007/0294240 A1   12/2007  Steele
2008/0005076 A1    1/2008  Payne
2009/0204592 A1    8/2009  Zhou
2010/0070448 A1*   3/2010  Omoigui ......................... 706/47
2011/0314026 A1*  12/2011  Pickens et al. ................ 707/741

OTHER PUBLICATIONS

Dean et al, MapReduce: Simplified Data Processing on Large Clusters Dec. 2004, OSDI'04: Sixth Symposium on Operating System Design and Implementation, http://static.googleusercontent.com/external_content/untrusted_dlcp/research.google.com/en/us/archive/mapreduce-osdi04.pdf.*
Dell Latitude D400 copyright 2004, Dell Inc., http://www.dell.com/downloads/us/products/latit/d400_spec.pdf.*
Automatic Extraction of Clickable Structured Web Contents for Name Entity Queries—Published Date: Apr. 26, 2010 http://research.microsoft.com/pubs/120887/fp0254-yin.pdf.
Building Taxonomy of Web Search Intents for Name Entity Queries—Published Date: Apr. 26, 2010 http://research.microsoft.com/pubs/120889/fp0700-yin.pdf.

(Continued)

*Primary Examiner* — Jason Liao
(74) *Attorney, Agent, or Firm* — Jessica Meyers; Doug Barker; Micky Minhas

(57) ABSTRACT

Methods, systems, and media are provided for facilitating generation of an inference index. In embodiments, a canonical entity is referenced. The canonical entity is associated with web documents. One or more queries that, when input, result in a selection of at least one of the web documents are identified. An entity document is generated for the canonical entity. The entity document includes the identified queries and/or associated text from the content of a document or from an entity title that result in the selection of the at least one of the web documents. The entity document and corresponding canonical entity can be combined with additional related entity documents and canonical entities to generate an inference index.

10 Claims, 8 Drawing Sheets

(56) References Cited

OTHER PUBLICATIONS

Google's Implicit Site Searches—Published Date: Aug. 20, 2010 http://googlesystem.blogspot.com/2010/08/googles-implicit-site-searches.html.

LG-ERM: An Entity-Level Ranking Mechanism for Deep Web Query—Published Date: Aug. 12, 2008 http://ieeexplore.ieee.org/stamp/stamp.jsp?tp=&arnumber=4596987.

Searching and Ranking in Entity-Relationship Graphs—Published Date: Dec. 23, 2009 http://domino.mpi-inf.mpg.de/intranet/ag5/ag5publ.nsf/6a06bf33407d587ec12565dd006fb8de/2c25044ad8d088fdc125763b003d5810/$FILE/gjergji_kasneci_phd.pdf.

Microsoft Research asia—Retrieved Date: Sep. 14, 2010 http://research.microsoft.com/en-us/labs/asia/msrabrochure_english.pdf.

* cited by examiner

INFERENCE INDEXING

BACKGROUND

It is important to ascertain the meaning underlying an input query in order to provide accurate and user-intended search results. A tagger can be used to tag each word in an unstructured query with a type, by means of a Markov model or conditional random field (CRF) tagger. The CRF tagger annotates ngrams (e.g., individual words, substrings, or phrases) in the query with labels. As an example, a CRF may label {u2 desire} as {BAND:u2 SONG:desire}. Individual words are stitched together to form a canonical entity (e.g., a person, place, or thing). A canonical entity has a string value assigned to it to apply a value or meaning to the entity. These canonical entities derived from the input query are forwarded to a downstream infrastructure for content index searching using the values of the fields. Candidate documents obtained from the downstream infrastructure are surfaced to the user in the form of search results.

Returning accurate and user-intended results can be difficult if the query contains implicit entity references (i.e., entity is inferred) rather than explicit entity references (i.e., entity is specified). Many times, an entity is embedded within the query as with implicit entity references. Misspelled entity references, as well as extraneous words, synonyms, nicknames, and alternate forms of a word cause additional difficulties in returning user-intended results. It is estimated that well over half of all input queries are altered in some way from the correct name or description. The most frequently altered type of queries are due to a high frequency of misspellings for named entities. In other cases, the primary information is not even present in the actual query. Therefore, a conventional entity tagger based on CRF will not be able to identify or retrieve content based upon the actual intended entity. Generally, if relevant explicit terms are not present in a query or the CRF has tagged irrelevant terms, then the downstream infrastructure will have difficulty in ascertaining which entity should be retrieved from web search indexes. An alternative approach to tagging words, correcting misspelled words, stitching words together and filling in the gaps, and canonicalizing words or entities is needed. An improved system for processing entities, such as implicit, non-canonical, and/or misspelled reference entities is desirable, regardless of how the entity is referenced in the input query.

SUMMARY

Embodiments of the invention are defined by the claims below. A high-level overview of various embodiments is provided to introduce a summary of the systems, methods, and media that are further described in the detailed description section below. This summary is neither intended to identify key features or essential features of the claimed subject matter, nor is it intended to be used as an aid in isolation to determine the scope of the claimed subject matter.

Systems, methods, and computer-readable storage media are described for inference index systems, and for generating and utilizing inference indexes. An inference index includes a listing of canonical entities. Each canonical entity is associated with an entity document that includes a list of queries that, if input, result in selection of a web document (e.g., a uniform resource locator or URL) associated with the canonical entity. The entity document could also include text from an associated URL or text from the entity title. The listing of queries for the entity document can be obtained, for example, via a query log(s). In embodiments, the inference index can be utilized upon a search query being input subsequent to generation of the inference index to identify or select a canonical entity (or multiple canonical entities) related or relevant to the search query. For example, a particular canonical entity may be selected as most relevant to a search query when the entity document associated with the canonical entity has a highest score within the entity document that matches ngrams of the search query, where an ngram could be a token, one or more words, a substring of words, or a phrase. Other factors that contribute to the overall score include ngrams which appear in the title of the canonical entity and the relative count of the ngram within the entity document.

BRIEF DESCRIPTION OF THE DRAWINGS

Illustrative embodiments of the invention are described in detail below, with reference to the attached drawing figures, which are incorporated by reference herein, and wherein.

DETAILED DESCRIPTION

Figure 1:
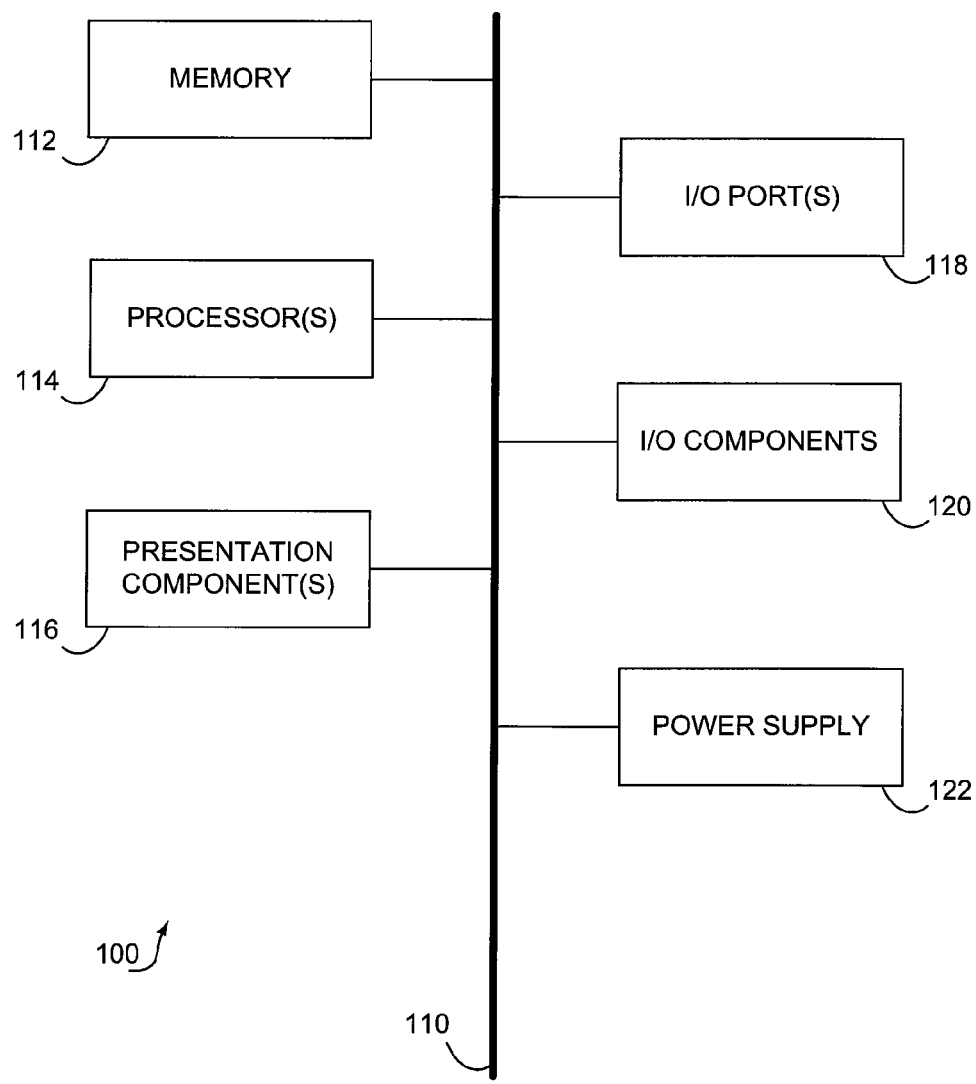
FIG. 1 is a block diagram illustrating an exemplary computer operating system used in accordance with embodiments of the invention.

Embodiments of the invention provide systems, methods and computer-readable storage media for inference indexes. This detailed description and the following claims satisfy the applicable statutory requirements.

The terms "step," "block," etc. might be used herein to connote different acts of methods employed, but the terms should not be interpreted as implying any particular order, unless the order of individual steps, blocks, etc. is explicitly described. Likewise, the term "module," etc. might be used herein to connote different components of systems employed, but the terms should not be interpreted as implying any particular order, unless the order of individual modules, etc. is explicitly described.

Embodiments of the invention include, without limitation, methods, systems, and sets of computer-executable instructions embodied on one or more computer-readable media. Computer-readable media include both volatile and nonvolatile media, removable and non-removable media, and media readable by a database and various other network devices. By way of example and not limitation, computer-readable storage media comprise media implemented in any method or technology for storing information. Examples of stored information include computer-useable instructions, data structures, program modules, and other data representations. Media examples include, but are not limited to information-delivery media, random access memory (RAM), read-only memory (ROM), electrically erasable programmable read-only memory (EEPROM), flash memory or other memory technology, compact-disc read-only memory (CD-ROM), digital versatile discs (DVD), Blu-ray disc, holographic media or other optical disc storage, magnetic cassettes, magnetic tape, magnetic disk storage, and other magnetic storage devices. These examples of media can be configured to store data momentarily, temporarily, or permanently. The computer-readable media include cooperating or interconnected computer-readable media, which exist exclusively on a processing system or distributed among multiple interconnected processing systems that may be local to, or remote from, the processing system.

Embodiments of the invention may be described in the general context of computer code or machine-useable instructions, including computer-executable instructions such as program modules, being executed by a computing system, or other machine or machines. Generally, program modules including routines, programs, objects, components, data structures, and the like refer to code that perform particular tasks or implement particular data types. Embodiments described herein may be implemented using a variety of system configurations, including handheld devices, consumer electronics, general-purpose computers, more specialty computing devices, etc. Embodiments described herein may also be implemented in distributed computing environments, using remote-processing devices that are linked through a communications network, such as the Internet.

In some embodiments, a computer-implemented method of facilitating generation of an inference index is provided. A canonical entity is referenced. The canonical entity is associated with web documents. One or more queries that, when input, result in a selection of at least one of the web documents are identified. An entity document is generated for the canonical entity. The entity document includes the identified queries that result in the selection of the at least one of the web documents. One or more computer-readable storage media containing computer readable instructions embodied thereon that when executed by a computing device, perform the above-described method of facilitating generation of an entity document is also given.

In other embodiments, a computer-implemented method of utilizing an inference index is given. The method includes receiving an input query having one or more ngrams. An inference index comprising a plurality of canonical entities and corresponding entity documents is accessed. Each of the entity documents includes one or more ngrams of an input query which were derived from or resulted from one or more selected web documents. The web documents are related to one of the plurality of canonical entities associated with the entity document. For a first ngram of a set of ngrams of the input query, each entity document that includes a query or associated text that matches the first ngram and its corresponding score are identified. The canonical entity corresponding with the entity document having the highest score that matches the first ngram is identified.

In yet other embodiments, an inference index system is given. The inference index system includes an inference index generating component to generate an inference index that includes a plurality of canonical entities associated with a knowledge domain. The inference index also includes an entity document in association with each canonical entity. The entity document includes one or more queries or associated text that, if input, result in selection of a uniform resource locator associated with the canonical entity. The inference index system also includes an entity selecting component to select a canonical entity relevant to a search query, or a portion thereof. The canonical entity is selected from among the plurality of canonical entities within an inference index based on a frequency of queries associated with each of the canonical entities that match at least a portion of the search query.

Having briefly described a general overview of the embodiments herein, an exemplary computing system is described below. Referring initially to FIG. 1, an exemplary operating environment for implementing embodiments of the present invention is shown and designated generally as computing device 100. The computing device 100 is but one example of a suitable computing system and is not intended to suggest any limitation as to the scope of use or functionality of embodiments of the invention. Neither should the computing device 100 be interpreted as having any dependency or requirement relating to any one or combination of components illustrated. In one embodiment, the computing device 100 is a conventional computer (e.g., a personal computer or laptop). Embodiments of the invention are also applicable to a plurality of interconnected computing devices, such as computing devices 100 (e.g., wireless phone, personal digital assistant, or other handheld devices).

The computing device 100 includes a bus 110 that directly or indirectly couples the following devices: memory 112, one or more processors 114, one or more presentation components 116, input/output (I/O) ports 118, input/output components 120, and an illustrative power supply 122. The bus 110 represents what may be one or more busses (such as an address bus, data bus, or combination thereof). Although the various blocks of FIG. 1 are shown with lines for the sake of clarity, delineating various components in reality is not so clear, and metaphorically, the lines would more accurately be gray and fuzzy. For example, one may consider a presentation component 116 such as a display device to be an I/O component 120. Also, processors 114 have memory 112. It will be understood by those skilled in the art that such is the nature of the art, and as previously mentioned, the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1, and are referenced as "computing device" or "computing system."

The computing device 100 can include a variety of computer-readable media. By way of example, and not limitation, computer-readable media may comprise RAM, ROM, EEPROM, flash memory or other memory technologies, CDROM, DVD or other optical or holographic media, magnetic cassettes, magnetic tape, magnetic disk storage or other magnetic storage devices, or similar tangible media that are configurable to store data and/or instructions relevant to the embodiments described herein.

The memory 112 includes computer-storage media in the form of volatile and/or nonvolatile memory. The memory 112 may be removable, non-removable, or a combination thereof. Exemplary hardware devices include solid-state memory, hard drives, cache, optical-disc drives, etc. The computing device 100 includes one or more processors 114, which read data from various entities such as the memory 112 or the I/O components 120. The presentation components 116 present data indications to a user or other device. Exemplary presentation components 116 include display devices, speaker devices, printing devices, vibrating devices, and the like.

The I/O ports 118 logically couple the computing device 100 to other devices including the I/O components 120, some of which may be built in. Illustrative I/O components 120 include a microphone, joystick, game pad, satellite dish, scanner, printer, wireless device, etc.

The components described above in relation to the computing device 100 may also be included in a wireless device. A wireless device, as described herein, refers to any type of wireless phone, handheld device, personal digital assistant (PDA), BlackBerry®, smartphone, digital camera, or other mobile devices (aside from a laptop), which communicate wirelessly. One skilled in the art will appreciate that wireless devices will also include a processor and computer-storage media, which perform various functions. Embodiments described herein are applicable to both a computing device and a wireless device. The computing system described above is configured to be used with the several computer-implemented methods, systems, and media for inference indexes generally described above and described in more detail hereinafter.

Figure 2:
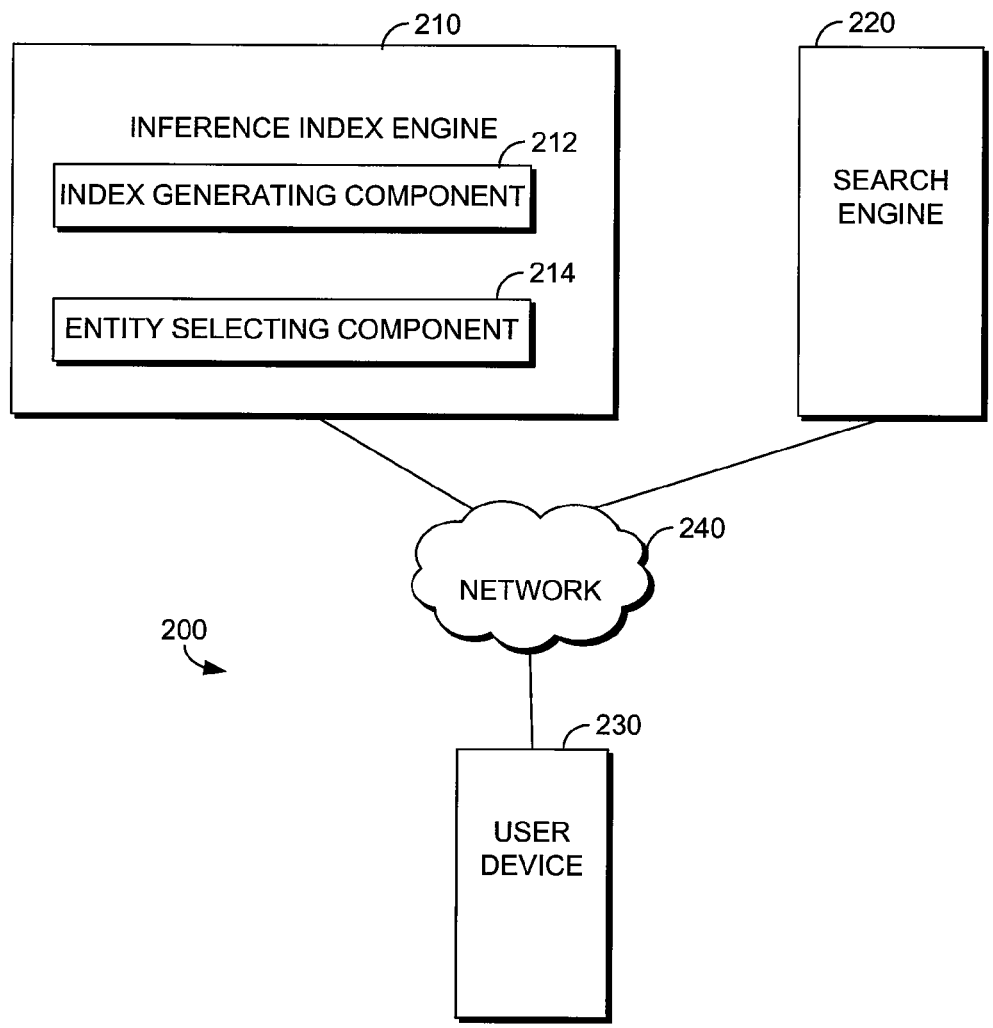
FIG. 2 is a block diagram illustrating an exemplary network environment.

Turning now to FIG. 2, a block diagram of an exemplary network environment 200 suitable for use in implementing embodiments of the invention is shown. The network environment 200 includes an inference index engine 210, a search engine 220, and a user device 230. The inference index engine 210, the search engine 220, and the user device 230 may communicate with one another via network 240. Network 240 may include any number of networks such as, for example, a local area network (LAN), a wide area network (WAN), the Internet, a cellular network, a peer-to-peer (P2P) network, a mobile network, or a combination of networks. The network environment 200 shown in FIG. 2 is an example of one suitable network environment and is not intended to suggest any limitation as to the scope of use or functionality of embodiments of the inventions disclosed throughout this document. Neither should the exemplary network environment 200 be interpreted as having any dependency or requirement related to any single component or combination of components illustrated therein. For example, the inference index engine 210 and the search engine 220 could be combined into a single engine. Further, any number of user devices 230 could be in communication with the inference index engine 210 and/or the search engine 220. Although the environment 200 is illustrated with a network 240, one or more of the components may directly communicate with one another.

The user device 230 can be any kind of computing device capable of allowing a user to submit a search query to the search engine 220 and/or the inference index engine 210 and to receive, in response to the search query, search results. For example, in an embodiment, the user device 230 can be a computing device such as computing device 100, as described above with reference to FIG. 1. In embodiments, the user device 230 can be a personal computer (PC), a laptop computer, a workstation, a mobile computing device, a PDA, a cell phone, or the like.

In an embodiment, the user device 230 is separate and distinct from the search engine 220 and/or the inference index engine 210 illustrated in FIG. 2. In another embodiment, the user device 230 is integrated with the search engine 220 and/or the inference index engine 210. For clarity of explanation, we shall describe embodiments in which the user device 230, the search engine 220, and the inference index engine 210 are separate, while understanding that this may not be the case in various configurations contemplated within the present invention.

With continued reference to FIG. 2, the user device 230 communicates with the search engine 220 to facilitate a search for content. In embodiments, for example, a user utilizes the user device 230 to search for content available via the network 240. For instance, in some embodiments, the network 240 might be the Internet, and the user device 230 interacts with a search service to search for content stored on servers associated with websites. In other embodiments, for example, the network 240 might be an enterprise network associated with a company. In these embodiments, the user device 230 interacts with the search engine 220 to search for content stored on various nodes within the enterprise network. It should be apparent to those having skill in the relevant arts that any number of other implementation scenarios may be possible as well.

The search engine 220 provides searching services to users. In embodiments, the search engine 220 provides searching services by searching for content in an environment in which content can be stored such as, for example, the Internet, a local area network (LAN), a wide area network (WAN), a database, a computer, or the like. The search engine 220, according to embodiments, can be implemented as server systems, program modules, virtual machines, components of a server or servers, networks, and the like.

In embodiments, the search engine 220 receives search queries, i.e., search requests, submitted by a user via the user device 230. Search queries received from a user can include search queries that were manually or verbally input by the user, queries that were suggested to the user and selected by the user, and any other search queries received by the search engine 220 that were somehow approved by the user. In other embodiments, the search engine 220 can receive search queries originating at other locations. For instance, query suggestion modules (not shown) associated with the search engine 220 can provide search queries in response to user selection of query suggestions, and the like. Generally, the search engine 220 can receive search queries from any number of people, locations, organizations, and devices.

In an embodiment, the search engine 220 monitors searching activity, and can produce one or more records or logs representing search activity, previous queries submitted, search result items obtained, uniform resource locators (URLs) of web domains that the users click on from the search results (e.g., stored in the form of a query click log), frequency with which users click on a web domain in response to a query (e.g., recorded in the query click logs), and the like. These services can be leveraged to improve the searching experience in many different ways. According to various embodiments of the invention, the search engine 220 references an associated web index (not illustrated for brevity and clarity of description) to identify search result items that are relevant to a search query received from a user.

In an embodiment, the search engine 220 is configured to receive a submitted query and to use the query to perform a search. Upon identifying search results that satisfy the search query, the search engine 220 returns a set of search results to the user device 230 by way of a graphical interface such as a search results page.

The inference index engine 210 generally generates an inference index and utilizes such an index to select one or more canonical entities associated with a search query. Generating an inference index of canonical entities and using such an index upon a query submission to select an entity(s) associated with the query provides a more accurate entity, regardless of misspellings or implicit entities within the query. As can be appreciated, the search engine 220 may communicate with the inference index engine 210 to enhance search engine results. The inference index engine 210, in some embodiments, includes an index generating component 212 and an entity selecting component 214. According to embodiments of the invention, the inference index engine 210 can include any number of other components not illustrated. In some embodiments, one or more of the illustrated components 212 and 214 can be integrated into a single component or can be divided into a number of different components. Components 212 and 214 can be implemented on any number of machines and can be integrated, as desired, with any number of other functionalities or services.

The index generating component 212 is configured to generate an inference index. An inference index, as used herein, refers to an index that includes a set of entities (e.g., canonical entities) and corresponding entity documents. An entity, as used herein, could refer to a person, place, or thing. By way of example only, an entity may be a particular song, a particular artist, a particular movie, a particular album, etc. A canonical entity refers to a single explicit representation of an entity. In this way, a common string value can represent a particular entity such that the entity can be uniquely identifiable, for example, irrespective of spelling errors, varied usage, varied words, etc. An entity document refers to a document or listing that includes one or more queries or ngrams of queries that, if input, result in search results that pertain to or are associated with a particular entity. An entity document can also include ngrams of text on pages or from titles. In an embodiment, an entity document could be a virtual document. A web document refers to an identification of an internet protocol resource, such as a website or webpage. For instance, a web document may be a uniform resource locator (URL) or a uniform resource identifier (URI).

In one embodiment, an inference index is generated in association with a particular knowledge domain. A knowledge domain, as used herein, refers to a domain that includes a set of related entities (e.g., canonical entities) based on subject matter. For instance, a knowledge domain might be a set of songs, a set of artists, a set of albums, a set of movies, a set of games, a set of sports players, etc. In this regard, each knowledge domain may correspond with an inference index. In an alternative embodiment, a single inference index or multiple inference indices may be generated irrespective of a knowledge domain. For example, all entities may be included in a single inference index.

In embodiments, each entity or canonical entity is associated with a particular entity document. Queries utilized to generate an entity document may be queries previously input by one or more users, such as queries within a query log. In such a case, queries and corresponding URLs selected in response to a query submission may be referenced from a query log and, thereafter, utilized to generate an entity document. Additionally or alternatively, queries utilized to generate an entity document may be automatically generated or user generated. For instance, a query may be generated using a rule(s).

In some cases, to generate an entity document, web documents (e.g., URLs) that correspond with an entity are identified. Upon identifying web documents corresponding with an entity, any queries that result in a click through to any such web documents can be identified and included within the entity document for that entity. A web document can be associated with an entity in any manner. In some embodiments, a web document is associated with an entity by analyzing a domain name or URL, webpage content, etc. Any number of web documents can be associated with an entity. For example, an entity might be associated with twenty URLs. In such a case, any query that results in selection of any one of the twenty URLs associated with an entity is included within the entity document. As can be appreciated, in some embodiments, an entity document may include additional data, such as text from other sources (e.g., music lyrics, movie synopsis, etc). For example, an entity document may include ngrams from contents of a webpage assigned to an entity.

Figure 3:
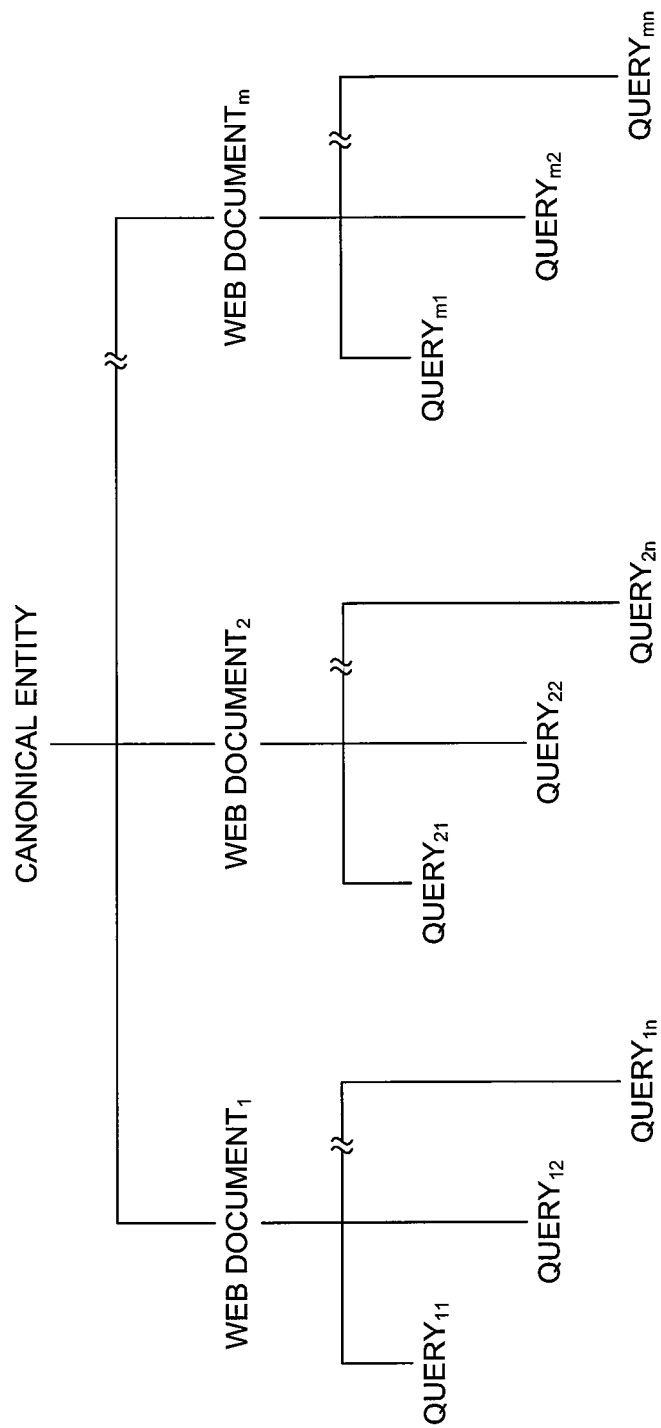
FIG. 3 is a block diagram illustrating development of an entity document for a particular canonical entity in accordance with embodiments of the invention.

FIG. 3 is a block diagram illustrating development of an entity document for a particular canonical entity that may be included within an inference index according to embodiments of the invention. For a particular canonical entity, one or more selected web documents may be identified, recognized, or provided, such as web document$_1$, web document$_2$, and web dodocument$_m$ illustrated in FIG. 3. For each selected web document that is mapped to the canonical entity, queries may be linked to the respective selected web documents, such as existing queries stored in a query database. As is illustrated in FIG. 3, web document$_1$ is associated or linked with query$_{11}$, query$_{12}$, and query$_{1n}$. Web document$_m$ is associated or linked with query$_{m1}$, query$_{m2}$, and query$_{2n}$. Web document$_{mm}$ is associated or linked with query$_{m1}$, query$_{m2}$, and query. The selected web documents (e.g., URLs) and/or their resulting linked queries are used to build an entity document for the canonical entity. Multiple related entity documents (not shown) may be combined into an inference index, which can be used by a downstream component during index content retrieval.

Figure 4:
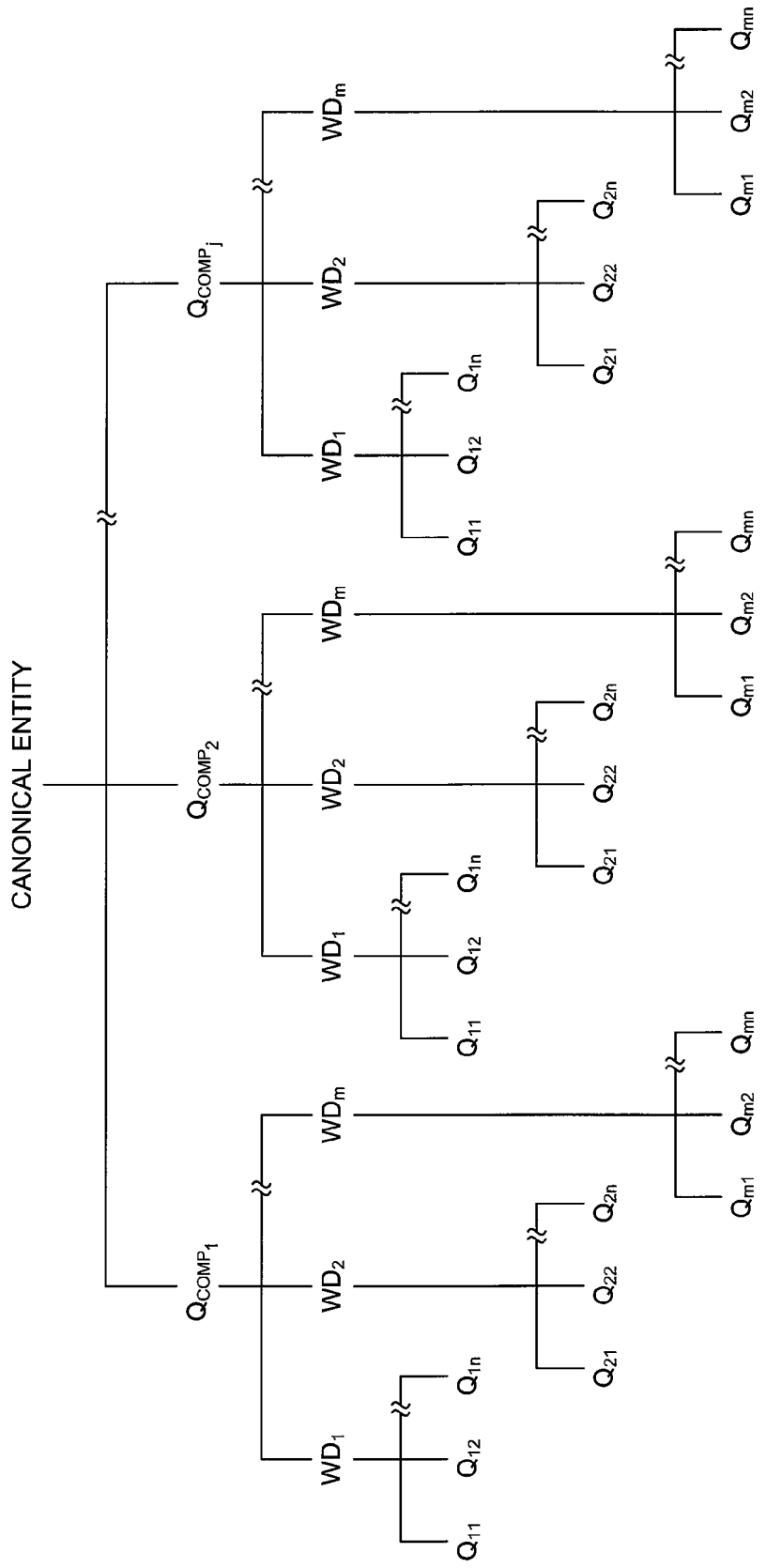
FIG. 4 is a block diagram illustrating another embodiment for developing an entity document for a particular canonical entity in accordance with embodiments of the invention.

FIG. 4 is a block diagram illustrating another embodiment for developing an entity document for a particular canonical entity. In order to encompass a large number of web documents associated with a canonical entity, artificial queries can be composed in addition to using real queries input by a user(s). Additional URL entity mappings can be discovered by using artificial queries. Scoping rules that link an entity to an associated category, such as [entity/lyrics] or [entity/music] can be used to generate or compose artificial queries. The top clicked URLs from these artificial queries are then identified and ranked, along with the real query rankings, which will be described hereinafter. Such artificial queries are designated in FIG. 4 as Qcomp$_1$, Qcomp$_2$, and Qcomp$_j$. Each of the composed artificial queries Qcomp$_1$, Qcomp$_2$, and Qcomp$_j$ are searched to obtain resulting linked web documents which are mapped to or associated with the canonical entity. These resultant web documents are designated in FIG. 4 as WD$_1$, WD$_2$, and WD$_m$ for each composed artificial query. Real queries input by users, which are linked to the respective resultant web documents, can be collected from a query database and may be included as part of the entity document for that canonical entity. For a first composed artificial query Qcomp$_1$, a first resultant web document, WD$_1$ has real queries, Q$_{11}$, Q$_{12}$, and Q$_{1n}$ linked to it. For the same composed artificial query Qcomp$_1$, a second resultant web document, WD$_2$ has real queries, Q$_{21}$, Q$_{22}$, and Q$_{2n}$ linked to it. The same composed artificial query Qcomp$_1$ has an m$^{th}$ resultant web document, WD$_m$ with real queries, Q$_{m1}$, Q$_{m2}$, and Q$_{mn}$ linked to it. Resulting web documents and corresponding linked queries are similarly associated with composed artificial queries Qcomp$_2$ and Qcomp$_j$ mapped to the canonical entity. The resulting web documents and/or associated linked queries identified may be combined with the artificial queries into an entity document for the canonical entity. One or more entity documents (e.g., related based on a knowledge domain) may be combined into an inference index. One or more computer-readable storage media containing computer-readable instructions embodied thereon that when executed by a computing device, perform the above-described method of facilitating generation of an entity document is also contemplated within embodiments of the invention.

Figure 5:
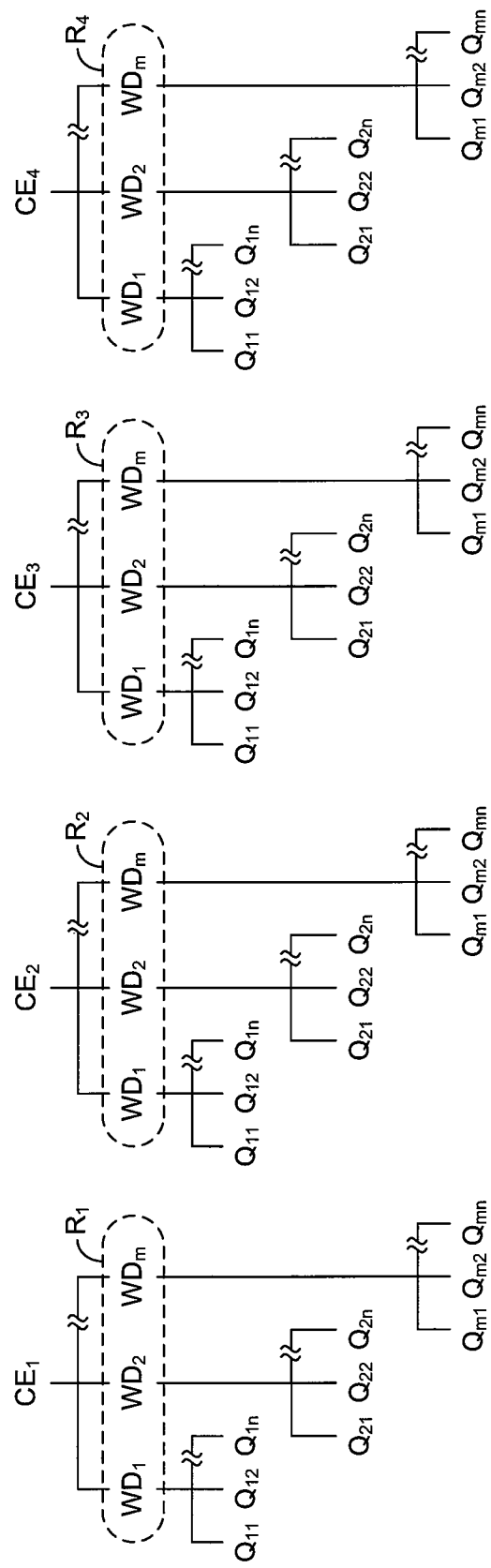
FIG. 5 is a block diagram illustrating an inference index used in accordance with embodiments of the invention.

FIG. 5 illustrates an inference index having multiple canonical entities, such as the canonical entities described above with reference to FIG. 3 or 4. An example input query in FIG. 5 may contain the words: elections, democrat, republican, and independent. Each of these four words may be divided into individual tokens or ngrams, which could be labeled as elections ($ngram_1$), democrat ($ngram_2$), republican ($ngram_3$), and independent ($ngram_4$). However, a similar but more defined input query may contain 2010 elections, liberal democrat, conservative republican, and moderate independent. In this latter example, there may be several more tokens or ngrams, since several combinations of the words are possible. The inference index contains a canonical entity $CE_1$, which has multiple web documents, $WD_1$, $WD_2$, and $WD_m$ mapped to the canonical entity $CE_1$. Each web document of $CE_1$ is associated with multiple queries and/or associated text. Web document $WD_1$ is linked to or is associated with queries $Q_{11}$, $Q_{12}$, and $Q_{1n}$. Web document $WD_2$ is linked to or is associated with queries $Q_{21}$, $Q_{22}$, and $Q_{2n}$. Web document $WD_m$ is linked to or is associated with queries $Q_{m1}$, $Q_{m2}$, and $Q_{mn}$. Canonical entities $CE_2$, $CE_3$, and $CE_4$ are structured with mapped web documents and linked queries, similar to $CE_1$. As can be appreciated, although FIG. 5 illustrates each canonical entity being associated with multiple web documents (WD), in embodiments, an entity document for the canonical entity may not include associated web documents. Rather, the entity document may include a listing of queries that are associated with such web documents. Alternatively, the entity document may include both the web documents and corresponding queries.

Returning to FIG. 2, the entity selecting component 214 is configured to select an entity in association with or that represents a query, or a portion thereof. In embodiments, the entity selecting component 214 is utilized upon a query being entered or submitted by a user. That is, an entity associated with or representing a query, or a portion thereof, is selected in real-time or at runtime, for example, to identify a top-ranked entity (e.g., from an inference index) for a given user query.

In some embodiments, initially, a query is separated into query ngrams, such as words or phrases, as discussed above with reference to FIG. 5. For each query ngram, entity documents are analyzed or searched to look for such a query ngram. In this regard, entity documents within or associated with an inference index (e.g., an inference index associated with a particular knowledge domain) may be searched or utilized to identify a frequency of query ngrams within the entity document. Each ngram within each entity document has a weight associated with it. These associated weights are a function of the total number of ngrams in the entity document, the frequency of the ngram in the entity document, the presence of the ngram in the title of the entity document, and/or the overall scarcity of the ngram in the entire corpus. Several other functions can be included as associated weights and are contemplated within embodiments of the invention. The weights of all the ngrams for a particular query are added together for each entity document. The canonical entity corresponding with such an entity document is designated as most likely to be associated with or represent the particular query ngram.

To determine or select an entity in association with or that represents a query, various query ngrams (e.g., words or substrings of the query) are analyzed to identify associated entity documents. The selected entity document(s) for each query ngram can be aggregated or analyzed to determine which of the entity documents is most relevant to the query. Such an aggregate comparison may be useful, for instance, when two words of a query are most related to an entity document while another word of the query is most related to a different entity document. As can be appreciated, in some embodiments, particular query ngrams are analyzed. For example, an analysis of ngrams is based on the expected function of the term (or lack thereof) in a query.

By way of example only, assume that a song title "Stairway to Heaven" is submitted as a user query. Further assume that the query "stairway to heaven" is divided into a "stairway" ngram and a "heaven" ngram. In such a case, an entity document for a first song entity may include the word "stairway" 500 instances because 500 users used the term "stairway" and thereafter, selected or clicked on a URL associated with the song entity. Because another entity document associated with another song entity titled "Stairway to My Heart" may also include instances of the word "stairway," each of the query portions may be analyzed. As such, an entity document that includes the most instances of the word "heaven" may also be identified. As the entity document for the first song entity includes more instances of the ngrams "stairway" and "heaven", the first song entity is selected as most relevant to the query "stairway to heaven."

By way of another example, frequency selection scores may be accumulated for each of the web documents. A frequency selection score is a number of times in which that particular web document was selected by a user(s). In such an embodiment, canonical entities of an inference index may have individual frequency selection scores for their respective web documents. The frequency selection scores associated with web documents for each canonical entity may be combined. By way of example and with reference to FIG. 5, $R_1$ represents an aggregate frequency selection score for $CE_1$, $R_2$ represents an aggregate frequency selection score for $CE_2$, $R_3$ represents an aggregate frequency selection score for $CE_3$, and $R_4$ represents an aggregate frequency selection score for $CE_4$. These four canonical entities are then ranked according to their individual aggregate frequency selection scores. The ranked results and/or aggregate frequency selection scores may be forwarded downstream to an index searching component, where content is retrieved based upon the received ranked canonical entities. In another embodiment of the invention, the frequency selection scores of the web documents within a particular canonical entity can be ranked according to the value of the frequency selection scores. This example illustrates how a score could be calculated based upon the frequency of web document selection. However, several other functions can also be taken into consideration when calculating a score, as previously discussed.

The inference index illustrated in FIG. 5 contains just four canonical entities with limited web documents mapped to them, as well as very limited queries linked to those web documents. In reality, each canonical entity may include any number of mapped web documents, and each web document may include any number of linked queries. A conventional index is content-based and requires several machines to service the indexes. However, each inference index according to embodiments of the invention is hosted at query time. Even though an inference index could be handled by a distributed, multi-machine system, it could also be handled by a single RAM machine.

Figure 6:
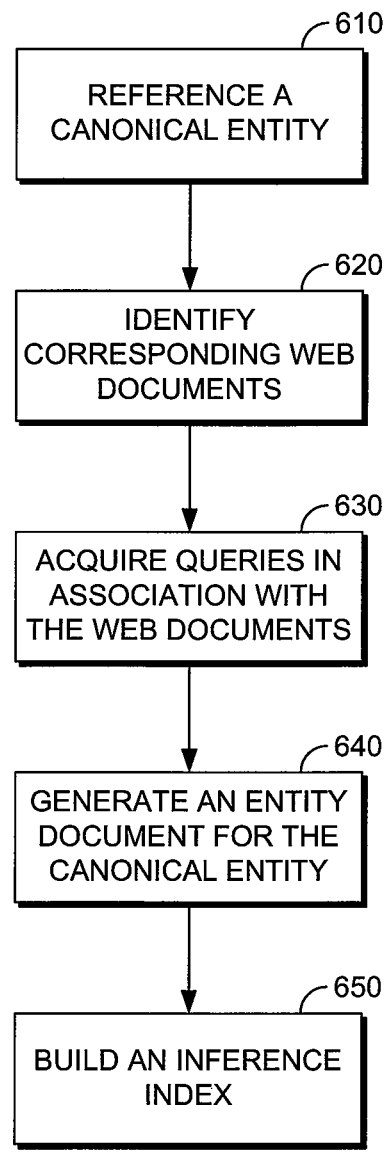
FIGS. 6 and 6A are flow diagrams of methods of building an inference index in accordance with embodiments of the invention.

FIG. 6 is a flow diagram for a method of building an inference index. A canonical entity is referenced in step 610. In embodiments, a canonical entity is referenced (e.g., identified, provided, accessed, received, retrieved, etc.) in association with an input query. In this regard, an ngram of a query can be mapped to or associated with a canonical entity and, thereafter, referenced. Instead of tagging a query and then passing the query to a downstream component, a canonical entity is determined upstream.

At step 620, web documents corresponding with the canonical entity are identified. A web document may correspond with a canonical entity when the web document is related to the entity (e.g., user(s) select the web document from among search results associated with the entity). By way of example, when a user clicks on a web document from search results, that web document is mapped to a canonical entity. The selected web documents can be obtained from query click logs, as an example. Queries that result in selection of a web document corresponding with the canonical entity are acquired in step 630. For example, every stored query that leads to a selected web document may be acquired in step 630. At step 640, an entity document is generated for the canonical entity. Such an entity document may contain all queries, or at least a portion of queries, that lead to all web pages, or a portion thereof, associated with the particular canonical entity. That is, all queries, or a portion thereof, that resulted in a click (selection) to any web document for the particular canonical entity may be included in the entity document, as well as any associated text from web document or from a document title. An inference index is built, at step 650, containing related entity documents, including the entity document generated at step 640. The inference indexes built according to embodiments of the invention are provided in response to input queries. The entity documents may be related in accordance with a particular knowledge domain.

Figure 6A:
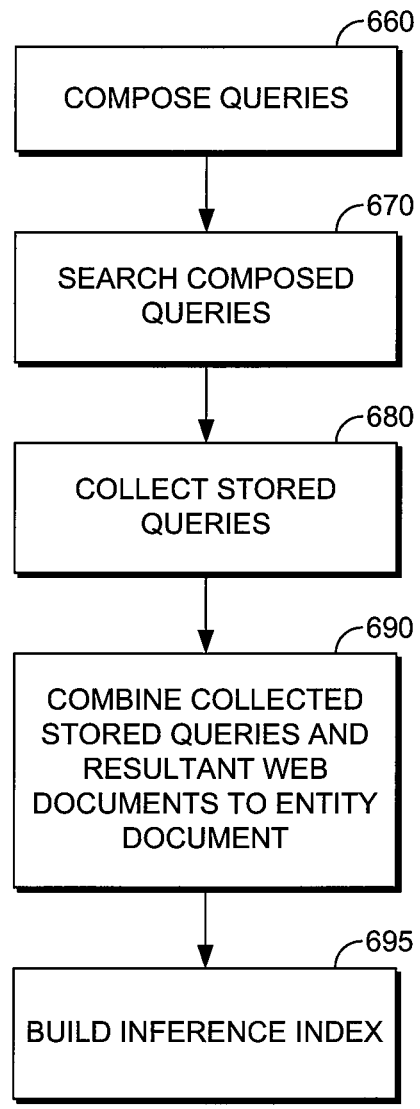

FIG. 6A is a flow diagram of a method of building an inference index according to another embodiment of the invention. In addition to the steps described above with reference to FIG. 6, one or more artificial queries are composed in step 660. Those artificial queries are searched in step 670, which will result in additional web documents that are mapped to the particular canonical entity. Stored queries that are linked to those additional web documents are collected in step 680. These additional web documents and/or their respective linked queries are combined with the entity document in step 690. The inference index is built to include these related entity documents in step 695. The artificial queries help to create a more robust and complete inference index. In another embodiment, an inference index can also be grown by including actual HTML content from a web document. Any other general content can be made a part of the inference index. Artificial web documents and their associated real linked queries can also be composed as part of the inference index.

Figure 7:
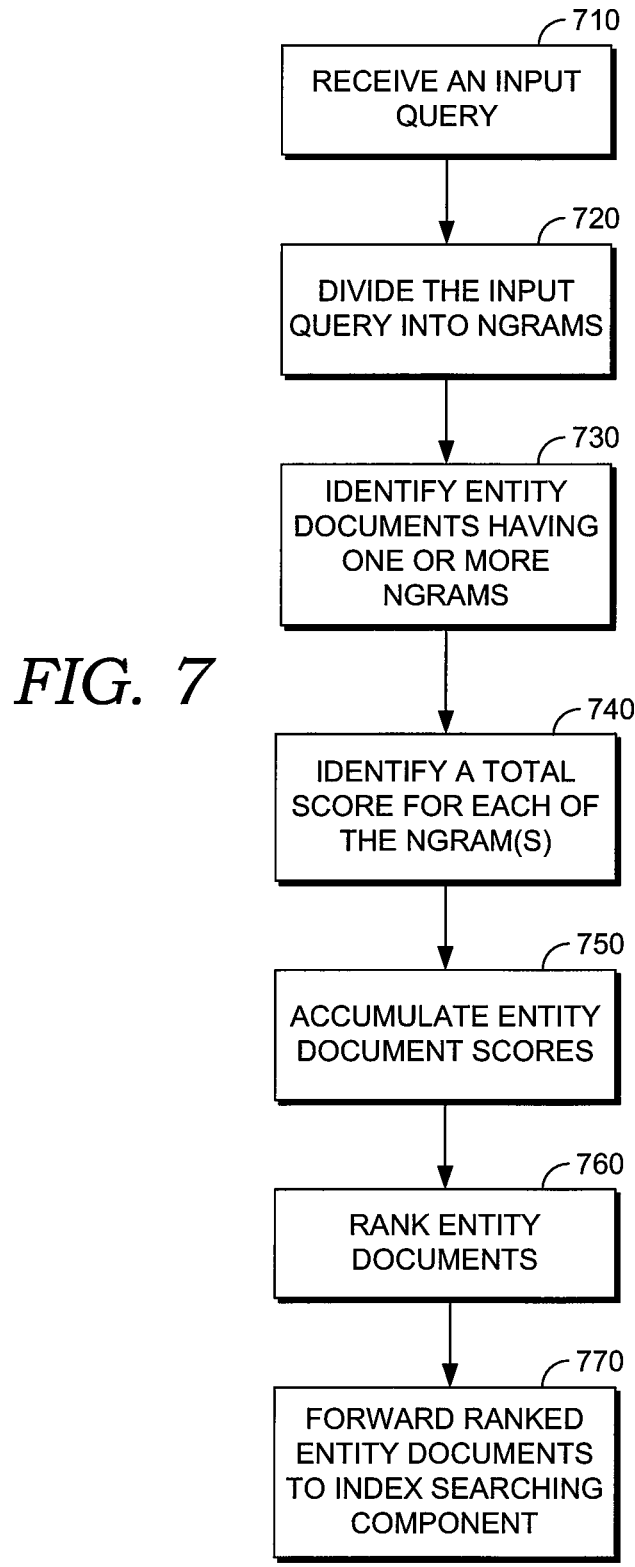
FIG. 7 is a flow diagram of a method of utilizing an inference index in accordance with embodiments of the invention.

FIG. 7 is a flow diagram of a method of utilizing an inference index. An input query is received in step 710, such as the input query discussed with regard to FIG. 5. The input query is divided into ngrams (e.g., words, phrases, or portions thereof) in step 720. Entity documents containing one or more ngrams from the input query are identified in step 730. At step 740, a total score is identified for each of the one or more ngrams. In some embodiments, a frequency of entries (e.g., queries) within an entity document that includes a particular ngram is determined.

At step 750, the scores for all of the ngrams within each entity document are accumulated or aggregated. For example, assume a query is "stairway to heaven." In such a case, a particular entity document may be associated with a frequency score of 500 queries having the word "stairway" that resulted in selection of a web document corresponding to a particular entity and a frequency score of 300 queries having the word "heaven" that resulted in selection of a web document corresponding to the same canonical entity. In some cases, each ngram (e.g., word or substring) has a weighted value applied to it that may be accounted for in aggregating the ngram scores for an entity document. Scoring factors can include giving more weight to a longer ngram, and giving multiple scores for inverted index lists that overlap. An inverted index contains a list of documents that contain a particular word. The inverted index is rated according to the number of times it appears within a document.

The entity documents are ranked according to the corresponding combined scores in step 760. These ranked entity documents and/or the corresponding document rankings are forwarded to an index searching component in step 770. During a look-up by the index searching component, the selected canonical entity and/or entity document can be surfaced using information retrieval procedures, such as text frequency inverted document frequency (TFIDF). However, other methods of retrieval are contemplated within embodiments of the invention.

Many different arrangements of the various components depicted, as well as embodiments not shown, are possible without departing from the spirit and scope of the invention. Embodiments of the invention have been described with the intent to be illustrative rather than restrictive.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method of facilitating generation of an inference index using a computing system having processor, memory, and data storage subsystems, the computer-implemented method comprising:

referencing a canonical entity that is associated with one or more web documents;

identifying a plurality of queries that, when input, result in a selection of at least one web document of the one or more web documents associated with the canonical entity;

generating, via the processor, an entity document for the canonical entity, the entity document including the plurality of identified queries and a representation of the at least one web document, wherein the plurality of identified queries resulted in the selection of the at least one web document corresponding with the canonical entity comprising a unique representation of an entity;

generating an inference index using the canonical entity and the entity document along with other related canonical entities and corresponding entity documents, the inference index corresponding with a knowledge domain of related canonical entities; and utilizing the inference index in response to a real-time user query provided by a user after generation of the inference index to select a particular canonical entity that is most related to the real-time user query, the particular canonical entity comprising a unique representation of an entity that indicates a person or place and that is selected based on a cumulative score associated with the selected canonical entity being greater than cumulative scores associated with one or more other canonical entities within the inference index, wherein each of the cumulative scores for the canonical entities comprises an aggregate of entity document scores within the corresponding canonical entity, each entity document score calculated based on a frequency of at least a portion of the real-time user query occurring within queries of the corresponding entity document.

2. The computer-implemented method of claim 1, wherein the entity document includes the one or more web documents.

3. The computer-implemented method of claim 1, further comprising:

composing one or more queries which are mapped to the canonical entity;
searching the composed one or more queries to obtain one or more resultant web documents mapped to the canonical entity;
collecting stored queries linked to the one or more resultant web documents; and
combining the collected stored queries to the entity document for the canonical entity.

4. The computer-implemented method of claim 1, wherein the association of the one or more web documents with the canonical entity is based on a user query or a composed query.

5. The computer-implemented method of claim 1, wherein one or more uniform resource locators are associated with the canonical entity corresponding with the entity document.

6. A computer-readable media, wherein the computer-readable media is one or more computer storage devices having computer-executable instructions embodied thereon that when executed by a computing device, perform a method, the method comprising:
   referencing a canonical entity that is associated with one or more web documents;
   identifying a plurality of queries that, when input, result in a selection of at least one web document of the one or more web documents associated with the canonical entity;
   generating, via the processor, an entity document for the canonical entity, the entity document including the plurality of identified queries and a representation of the at least one web document, wherein the plurality of identified queries resulted in the selection of the at least one web document corresponding with the canonical entity comprising a unique representation of an entity;
   generating an inference index using the canonical entity and the entity document along with other related canonical entities and corresponding entity documents, the inference index corresponding with a knowledge domain of related canonical entities; and
   utilizing the inference index in response to a real-time user query provided by a user after generation of the inference index to select a particular canonical entity that is most related to the real-time user query, the particular canonical entity comprising a unique representation of an entity that indicates a person or place and that is selected based on a cumulative score associated with the selected canonical entity being greater than cumulative scores associated with one or more other canonical entities within the inference index, wherein each of the cumulative scores for the canonical entities comprises an aggregate of entity document scores within the corresponding canonical entity, each entity document score calculated based on a frequency of at least a portion of the real-time user query occurring within queries of the corresponding entity document.

7. The media of claim 6, wherein the entity document includes the one or more web documents.

8. The media of claim 6, wherein the method further comprises:
   composing one or more queries which are mapped to the canonical entity;
   searching the composed one or more queries to obtain one or more resultant web documents mapped to the canonical entity;
   collecting stored queries linked to the one or more resultant web documents; and
   combining the collected stored queries to the entity document for the canonical entity.

9. The media of claim 6, wherein the association of the one or more web documents with the canonical entity is based on a user query or a composed query.

10. The media of claim 6, wherein one or more uniform resource locators are associated with the canonical entity corresponding with the entity document.

* * * * *